(12) United States Patent
Stefanov

(10) Patent No.: US 12,038,996 B2
(45) Date of Patent: *Jul. 16, 2024

(54) METHOD AND SYSTEM FOR CAUSING A BROWSER TO PRELOAD WEB PAGE COMPONENTS

(71) Applicant: YAHOO ASSETS LLC, Dulles, VA (US)

(72) Inventor: Stoyan Stefanov, Los Angeles, CA (US)

(73) Assignee: YAHOO ASSETS LLC, New York, NY (US)

( * ) Notice: Subject to any disclaimer, the term of this patent is extended or adjusted under 35 U.S.C. 154(b) by 483 days.

This patent is subject to a terminal disclaimer.

(21) Appl. No.: 16/281,321

(22) Filed: Feb. 21, 2019

(65) Prior Publication Data

US 2019/0188233 A1 Jun. 20, 2019

Related U.S. Application Data

(63) Continuation of application No. 15/254,540, filed on Sep. 1, 2016, now Pat. No. 10,216,858, which is a
(Continued)

(51) Int. Cl.
| | |
|---|---|
| *G06F 16/957* | (2019.01) |
| *G06F 16/951* | (2019.01) |
| *G06F 16/26* | (2019.01) |
| *G06F 16/332* | (2019.01) |
| *G06F 16/9032* | (2019.01) |

(52) U.S. Cl.
CPC ........ *G06F 16/9574* (2019.01); *G06F 16/951* (2019.01); *G06F 16/26* (2019.01); *G06F 16/3322* (2019.01); *G06F 16/90324* (2019.01)

(58) Field of Classification Search
CPC ................. G06F 16/3322; G06F 16/26; G06F 16/90324; G06F 16/951; G06F 16/9574; G06F 16/285; G06F 16/9535; G06F 16/24578; G06F 16/958; G06F 16/953;
(Continued)

(56) References Cited

U.S. PATENT DOCUMENTS 6,820,236 B1 * 11/2004 Bates .................... G06F 16/958
715/236
7,124,129 B2 10/2006 Bowman et al.
(Continued)

*Primary Examiner* — Marcin R Filipczyk
(74) *Attorney, Agent, or Firm* — James J. DeCarlo; Greenberg Traurig, LLP

(57) ABSTRACT

Disclosed is a server computer that receives, over a network from a computing device, a request for a search suggestion related to a search query that is input into a search term entry area displayed by a web browser executing on the computing device. In response to receiving the request, the server computer transmits over the network to the computing device, instructions for the computing device to display a search suggestion related to the search query, the search suggestion corresponding to a search results web page. The instructions further cause the computing device to store, in a memory of the computing device, a web page component associated with the search results web page without causing the computing device to visibly display the web page component during display of the search suggestion.

19 Claims, 11 Drawing Sheets

Related U.S. Application Data continuation of application No. 12/540,502, filed on Aug. 13, 2009, now Pat. No. 9,436,777.

(58) Field of Classification Search
CPC ............ G06F 16/9532; G06F 16/9538; G06F 16/3338; G06F 16/338; G06Q 30/0601
See application file for complete search history.

(56) References Cited

U.S. PATENT DOCUMENTS

| | | |
|---|---|---|
| 7,552,112 B2 | 6/2009 | Jhala et al. |
| 2004/0044661 A1 | 3/2004 | Allen et al. |
| 2004/0186827 A1* | 9/2004 | Anick ................ G06F 16/3325 |
| 2006/0129536 A1 | 6/2006 | Foulger et al. |
| 2006/0155857 A1* | 7/2006 | Feenan, Jr. ......... G06F 16/9574 |
| | | 709/227 |
| 2006/0190436 A1* | 8/2006 | Richardson ............ G06F 40/40 |
| 2006/0288000 A1 | 12/2006 | Gupta |
| 2007/0101008 A1* | 5/2007 | Gomez ................ H04L 69/329 |
| | | 709/228 |
| 2007/0208738 A1 | 9/2007 | Morgan |
| 2015/0081457 A1* | 3/2015 | Agnes ................ G06Q 30/0635 |
| | | 705/14.73 |

* cited by examiner

METHOD AND SYSTEM FOR CAUSING A BROWSER TO PRELOAD WEB PAGE COMPONENTS

CROSS-REFERENCE TO RELATED APPLICATIONS

This continuation application claims priority from application Ser. No. 15/254,540, filed Sep. 1, 2016, entitled "METHOD AND SYSTEM FOR CAUSING A BROWSER TO PRELOAD WEB PAGE COMPONENTS", which claims priority from application Ser. No. 12/540,502, filed Aug. 13, 2009, entitled "METHOD AND SYSTEM FOR CAUSING A BROWSER TO PRELOAD WEB PAGE COMPONENTS", which are hereby incorporated herein by reference.

FIELD

The present disclosure relates to web pages, and more specifically to causing a web browser to preload web page components to enable faster loading of web pages using the preloaded web page components.

BACKGROUND

When a user uses a web browser to navigate to a particular web site, the web browser typically performs a Domain Name System (DNS) lookup in order to resolve the textual domain name of the web site to a physical Internet Protocol (IP) address. Once the web browser obtains the IP address of the domain name, the web browser can then retrieve web pages of the web site because the web browser has determined the server to navigate to (via the IP address). This DNS lookup takes time and often slows down a user's experience on the web.

Further, when a user uses a web browser to navigate to a particular web page for the first time, the web browser typically has to retrieve web page components (e.g., images) associated with the particular web page before the web browser can display the web page. Even if the user has navigated to the particular web page in the past, the web browser may have to retrieve the web page components associated with the particular web page if the web page components are not already stored by the user's computer. Like a DNS lookup, this retrieval of web page components associated with a particular web page takes time and again slows down a user's experience on the web.

SUMMARY

The present disclosure relates to causing a web browser to preload web page components to enable faster loading of web pages using the preloaded web page components.

In one aspect, a server computer receives, over a network from a computing device, a request for a search suggestion related to a search query that is input into a search term entry area displayed by a web browser executing on the computing device. In response to receiving the request, the server computer transmits over the network to the computing device, instructions for the computing device to display a search suggestion related to the search query, the search suggestion corresponding to a search results web page. The instructions further cause the computing device to store, in a memory of the computing device, a web page component associated with the search results web page without causing the computing device to visibly display the web page component during display of the search suggestion. In one embodiment, the instructions include instructions for the computing device to display a plurality of search suggestions related to the search query, where each search suggestion in the plurality corresponds to a search results web page. In one embodiment, when the server transmits the search results web page to the computing device for display, the computing device uses the stored web page component when displaying the search results web page.

In one embodiment, the web page component includes a selected web page asset identified as part of the search results web page. The transmitting of the instructions to cause the computing device to store a web page component without causing the computing device to display the web page component can further include transmitting instructions to the computing device that set the width and height of the web page component to a small number of pixels (e.g., zero or one pixels) so that the web page component is hidden from view when the computing device displays the search suggestion.

In one embodiment, an expire time is set for the web page component, where the expire time corresponds to a date and time upon which the web page component will no longer be stored by the computing device.

In one embodiment, the transmitting of instructions for the computing device to display a search suggestion related to the search query further includes setting a cookie with a timestamp. In one embodiment, the server computer receives a second request for a second search suggestion related to a second search query. The server computer checks that the time period associated with the timestamp of the cookie has not elapsed and, if the time period has not elapsed, the server computer transmits instructions to the computing device for the computing device to display a search suggestion related to the second search query. The instructions further cause the computing device to store a web page component associated with a search results web page corresponding to the search suggestion related to the second search query. In one embodiment, if the time period has elapsed, the server computer transmits instructions for the computing device to display a search suggestion related to the second search query without causing the computing device to store a web page component associated with a search results web page corresponding to the search suggestion related to the second search query.

In another aspect, a server computer hosts a web page component on a web page having a domain name. The server computer receives, over a network from a computing device, a request for a search suggestion related to a search query that is input into a search term entry area displayed by a web browser executing on the computing device. The server computer transmits in response to the request, over the network to the computing device, instructions for the computing device to display a search suggestion related to the search query, the search suggestion corresponding to a search results web page, wherein the instructions further cause the computing device to perform a Domain Name System (DNS) lookup of the domain name of the web page, cause the computing device to store, in a memory of the computing device, the IP address associated with the domain name, and cause the computing device to download, but not visibly display during the display of the search suggestion, the web page component. In one embodiment, when the server transmits the search results web page to the computing device for display, the computing device uses the stored IP address associated with the domain name so that the computing device does not have to perform a DNS lookup.

Further, in one embodiment, the computing device uses the stored web page component when displaying the search results web page.

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1:
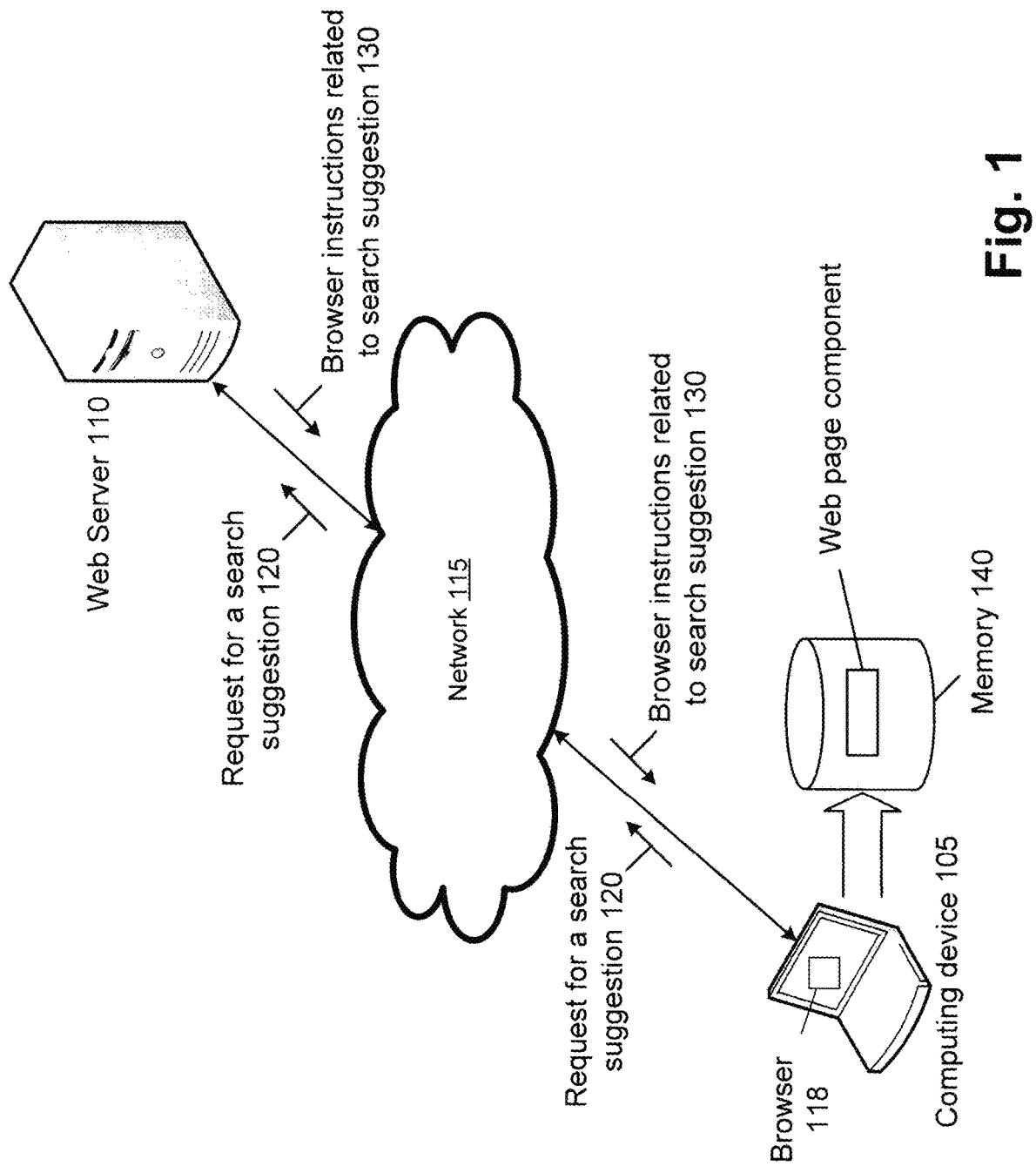
FIG. 1 is a block diagram of a computing device communicating with a web server over a network in accordance with an embodiment of the present disclosure.

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the invention that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Figure 2:
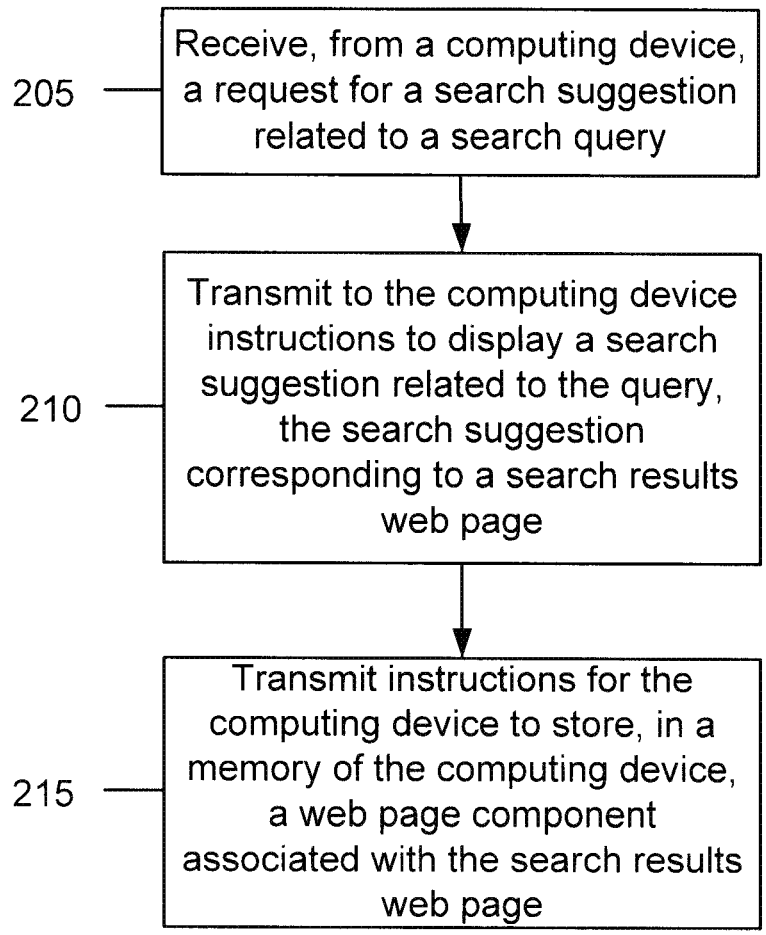
FIG. 2 is a flowchart illustrating the steps performed by the web server of FIG. 1 to cause the computing device to store a web page component associated with a search results web page in accordance with an embodiment of the present disclosure.

FIG. 1 shows a block diagram of an embodiment of a computing device 105 communicating with a web server 110 over a network 115. FIG. 2 is a flowchart showing an embodiment of steps performed by the web server 110. A user of the computing device 105 uses a web browser 118 executing on the computing device 105 to, for example, perform a web search and/or navigate to a web page. When a user wants to perform a web search (e.g., for particular web pages containing specific subject matter), the user typically inputs (e.g., types) a search query into a search term entry area. The search term entry area can be an area that is part of the web browser itself, or can be part of a web page that is being displayed by the web browser.

When the user inputs the search query, in one embodiment the computing device 105 (e.g., the web browser 118) transmits a request 120 for one or more search suggestions related to the search query. As used herein, a "search query" is any symbol or character that is input into a search term entry area. A search query can be a letter, a symbol, a part of a word, a complete word, more than one word, etc. Thus, in one embodiment, the request 120 for a search suggestion can be transmitted after a predetermined time period has elapsed after an input is received in the search term entry area. Additionally, many requests 120 can be transmitted from the computing device 105 to the web server 110 as the input into the search term entry area changes.

For example, a user may intend to input the word "example" into a search term entry area. In one embodiment, the computing device 105 transmits a first request for a search suggestion after the user has typed "exa" into the search term entry area (where "exa" is, in this example, a first search query). The computing device 105 then transmits a second request for a search suggestion after the user has typed "examp" into the search term entry area (where "examp" is, in this example, a second search query). The computing device 105 then transmits a third request for a search suggestion when the user has completed typing the word "example" into the search term entry area (where "example" is, in this example, a third search query). Thus, any number of requests 120 for search suggestions can be transmitted by the computing device 105 to the web server 110.

The web server 110 receives the request 120 for a search suggestion (step 205) and, in response to the request, transmits browser instructions 130 related to the search suggestion (step 210) to the web browser 118. In one embodiment, the browser instructions 130 instruct the web browser 118 to display a particular search suggestion (or multiple search suggestions) related to the search query. In one embodiment, the browser instructions 130 are in an eXtensible Markup Language (XML) document. As described in more detail below (see, e.g., FIG. 7), in one embodiment the search suggestion corresponds to a search results web page. As used herein, a search results web page is a web page that provides search results (e.g., a listing of web page links to other web pages as well as information (e.g., text and/or an image) retrieved from the web page associated with the link) that correspond to the search suggestion. When a user selects (e.g., clicks on) a search suggestion, the web browser 118 then displays the corresponding search results web page.

In one embodiment, the browser instructions 130 additionally include instructions for the browser 118 (or computing device 105) to store, in memory 140, a web page component 150 associated with the search results web page (step 215) corresponding to the search suggestion. In one embodiment, the instructions 130 do not cause the browser 118 to visibly display the web page component 150 during display of the search suggestion. In one embodiment, if the web server 110 transmits browser instructions 130 for the browser 118 to display multiple search suggestions related to a search query, the instructions 130 can further include instructions for the browser 118 to store multiple web page components 150, where each web page component is related to one (or more) search results web page(s). The memory 140 can be any type of memory or storage associated with the computing device 105, such as cache (e.g., browser cache), Random Access Memory (RAM), a hard drive, etc. In one embodiment, steps 210 and 215 occur at the same time (or approximately the same time). In another embodiment, steps 210 and 215 occur sequentially.

The web page component 150 is any web page asset identified as part of or associated with a search results web page. Examples of the web page component 150 include, but are not limited to, images (e.g., png, gif, jpeg, bmp, wbmp, ico, tiff, svg, ai, eps, ps), scripts (e.g., JavaScript/ECMAScript files, Visual Basic Script (VBScript) files, etc.), programming code (e.g., cpp, php, rb, py, perl, bat, sh, asp, jsp, java), executables (e.g., exe, cmd, class), binaries (e.g., bin, dll, so, iso, lzh), CSS Stylesheets, Audio files (e.g., mp3, ogg, aiff, midi, way), video files (e.g., avi, mpeg, mov, flv, m4v, wmv), HTML, XML, XHTML, MathML, VML, RDF, DTD, SGML, SMIL, SOAP, KML, plain text files (e.g., txt, csv, conf, log, in, ini), JavaScript Object Notation (JSON) files, archives (e.g., zip, rar, jar, gz, bzip, tar, mht), Shockwave Flash/Adobe Flash (e.g., swf), documents (e.g., Word doc, PDF, RTF, ODT), spreadsheets, presentation files, and/ or a feed (e.g., Atom, RSS).

Thus, the downloading of a web page component associated with a search results web page occurs before or during the display of a search suggestion, and therefore before the web browser 118 displays a search results web page. As a result, when a user selects (e.g., clicks on) a particular search suggestion, the browser 118 can load the corresponding search results web page faster because one or more web page components 150 used in the search results web page is already stored by the browser 118 in memory 140 (e.g., in browser cache). The browser 118 does not have to retrieve the web page component(s) 150 after the user selects a particular search results web page.

In one embodiment, the web server 110 also transmits (as part of the browser instructions 130) an expire time for the web page component 150. The expire time can correspond to a date and time upon which the web page component 150 will no longer be stored by the computing device 105.

For purposes of this disclosure (and as described in more detail below with respect to FIG. 11), a computer or computing device such as the computing device 105 and/or web server 110 includes a processor and memory for storing and executing program code, data and software which may also be tangibly stored or read from any type or variety of well known computer readable storage media such as magnetic or optical discs, by way of non-limiting example. Computers can be provided with operating systems that allow the execution of software applications in order to manipulate data. Personal computers, personal digital assistants (PDAs), wireless devices, cellular telephones, internet appliances, media players, home theater systems, servers, and media centers are several non-limiting examples of computing devices. The computing device 105 and the server 110 can, in one embodiment, also include a display, such as a screen or monitor.

Figure 3:
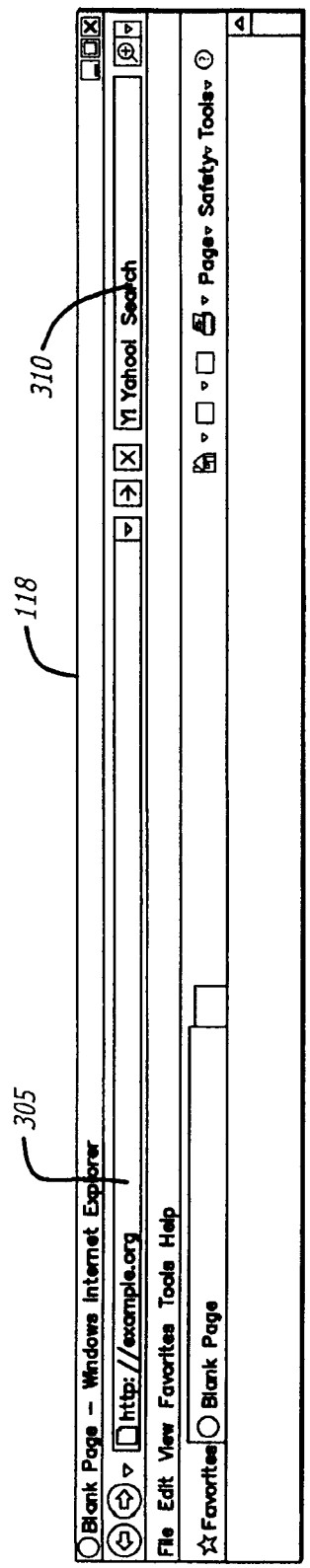
FIG. 3 is a screen shot displayed by a web browser on the computing device illustrating an address bar and a search term entry area in accordance with an embodiment of the present disclosure.

FIG. 3 is a screen shot displayed by the web browser 118 illustrating an embodiment of an address bar 305 and a search term entry area 310. As stated above, the search term entry area 310 can be part of the browser 118 itself (as shown), or it may be part of a web page being displayed by the web browser 118. Suppose that the web browser 118 is Internet Explorer 8 (IE8) (developed by Microsoft Corporation of Redmond, Washington). Using the example above, when a user of the web browser 118 types the word "example" into the search term entry area 310, the web browser 118 sends request 120 to the web server 110. Further suppose that the web server 110 is a Yahoo! search server (developed by Yahoo! Inc. of Sunnyvale, California). As an example, the Uniform Resource Locator (URL) of the request 120 may be:

http://ie.search.yahoo.com/
os?appid=ie8&command=example

In one embodiment, in response to receiving the request 120, the web server 110 transmits an XML document to the web browser 118. In one embodiment, the XML document looks as follows:

```
<?xml version="1.0"?>
<SearchSuggestion version="2.0" xmlns="http://opensearch.org/
searchsuggest2">
    <Query>example</Query>
    <Section title="Yahoo! Search Suggestions">
        <Item><Text>example of resume</Text></Item>
        <Item><Text>example of resignation letter</Text></Item>
        ....
        <Item><Text>annotated bibliography example</Text></Item>
    </Section>
</SearchSuggestion>
```

Figure 4:
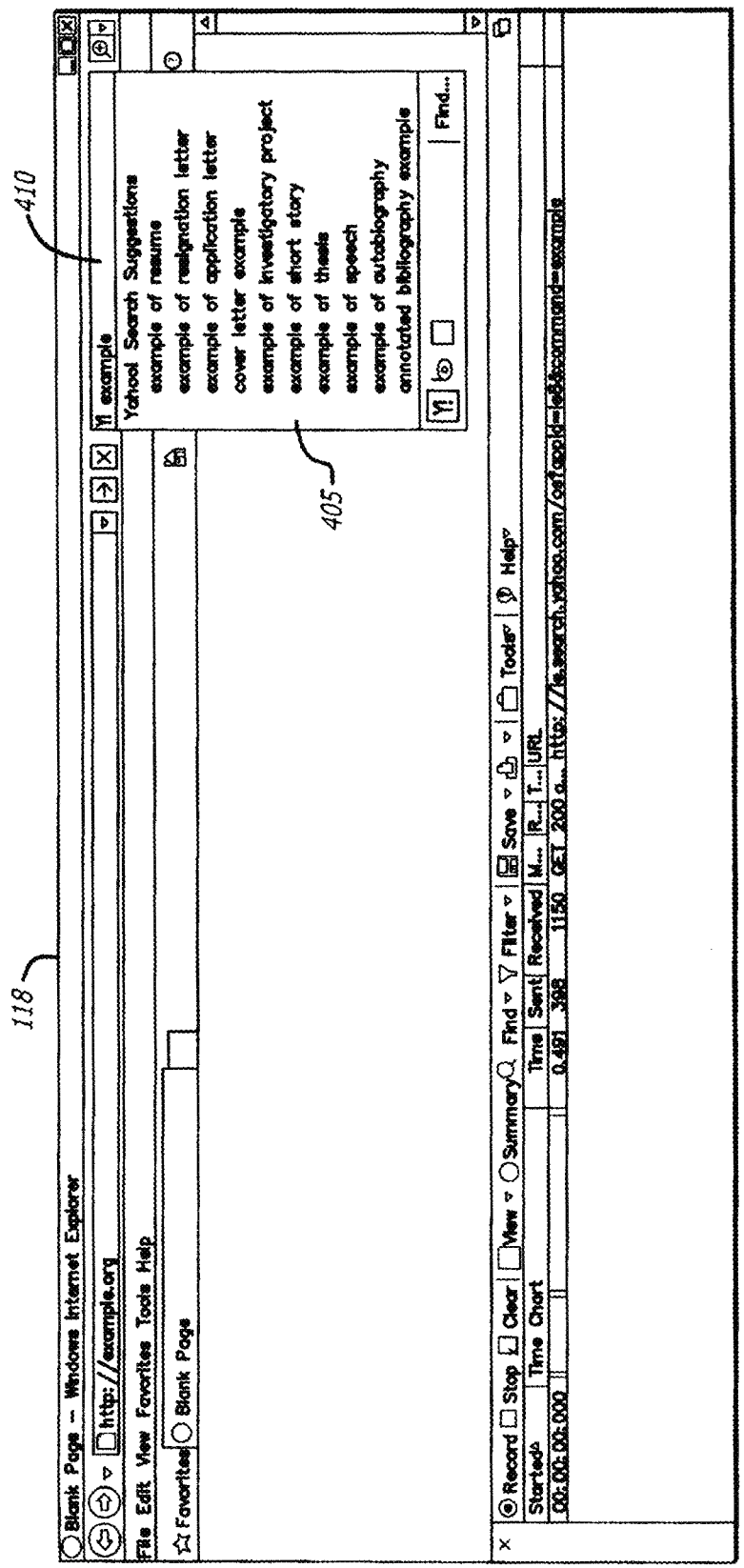
FIGS. 4 and 5 show embodiments of search suggestions being displayed below the search term entry area in the browser in accordance with an embodiment of the present disclosure.
Figure 5:
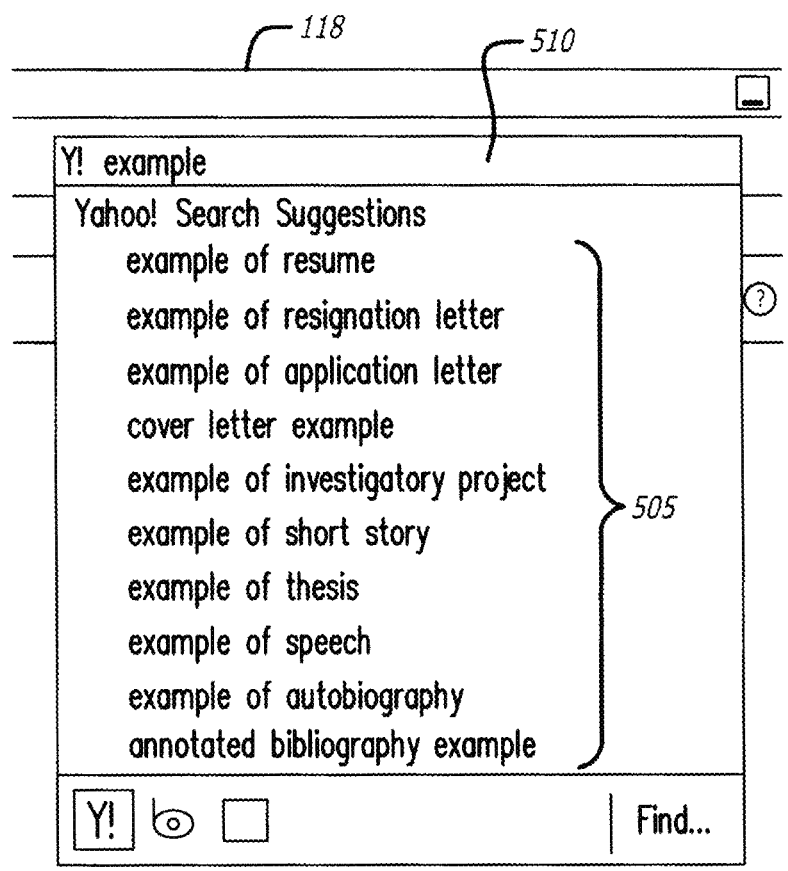

FIGS. 4 and 5 show an embodiment of the search suggestions 405, 505 being displayed below the search term entry area 410, 510 in the browser 118.

As described above, the web server 110 transmits to the web browser 118 a web page component 150 associated with a search results web page corresponding to a search suggestion, even when the web page component 150 is not needed by the search suggestion. The web page component 150 is needed once the user clicks on the search suggestion and is directed to the search results web page.

An example of the relevant part of the XML document provided by the web server 110 as part of the browser instructions 130 to the browser 118 is as follows:

```
<Item>
    <Text>example of resume</Text>
    <Image source="http://a.l.yimg.com/a/i/us/sch/gr4/
    ngsprt_20090618.png" width="0"
    height="0"/>
</Item>
```

Figure 6:
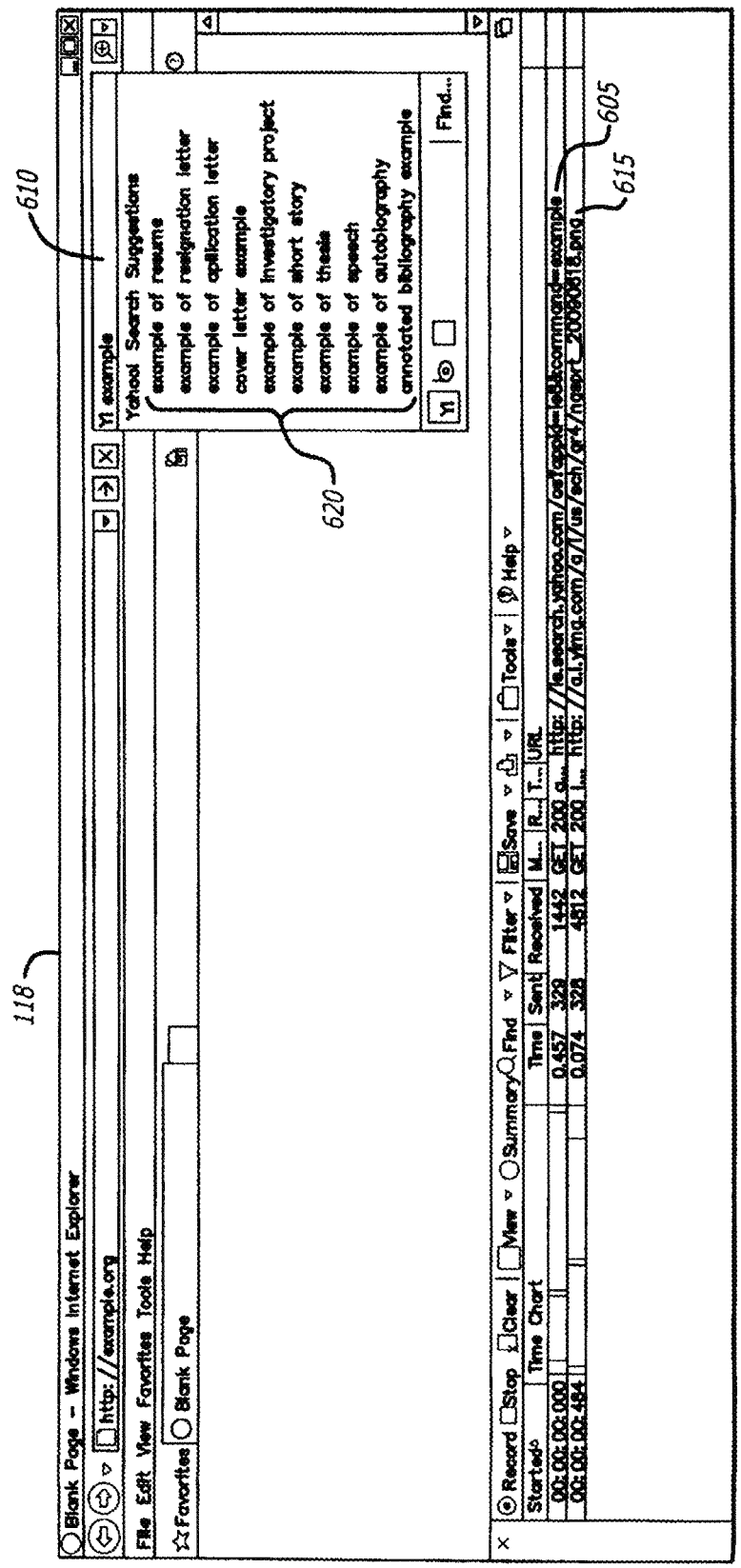
FIG. 6 shows an embodiment of an illustration of the number of requests made by the web browser in accordance with an embodiment of the present disclosure.

The web browser 118 receives this XML document, downloads the image (web page component) from http://a.l.yimg.com/a/i/us/sch/gr4/ngsprt_20090618.png, and stores the image in its memory 140. The web browser 118 does not visibly display the image because the height and width of the image are defined as 0×0 pixels (the height and width of the image could instead be defined as 1×1 pixels, for example). FIG. 6 shows an embodiment of an illustration of the number of requests made by the web browser 118. The web browser 118 makes two requests in this example—a first request 605 for search suggestions related to the word "example" that was input into the search term entry area 610, and a second request 615 to download the image (ngsprt_20090618.png) in response to receiving the command in the browser instructions 130 of <Image source="http://a.l.yimg.com/a/i/us/sch/gr4/ngsprt_20090618.png" width="0" height="0"/>. The user then clicks on one of the search suggestions 620, and the browser 118 navigates to the corresponding search results web page. In one embodiment, the image or images that the browser 118 stored (e.g., cached) will not be requested again, resulting in a faster user experience.

Figure 7:
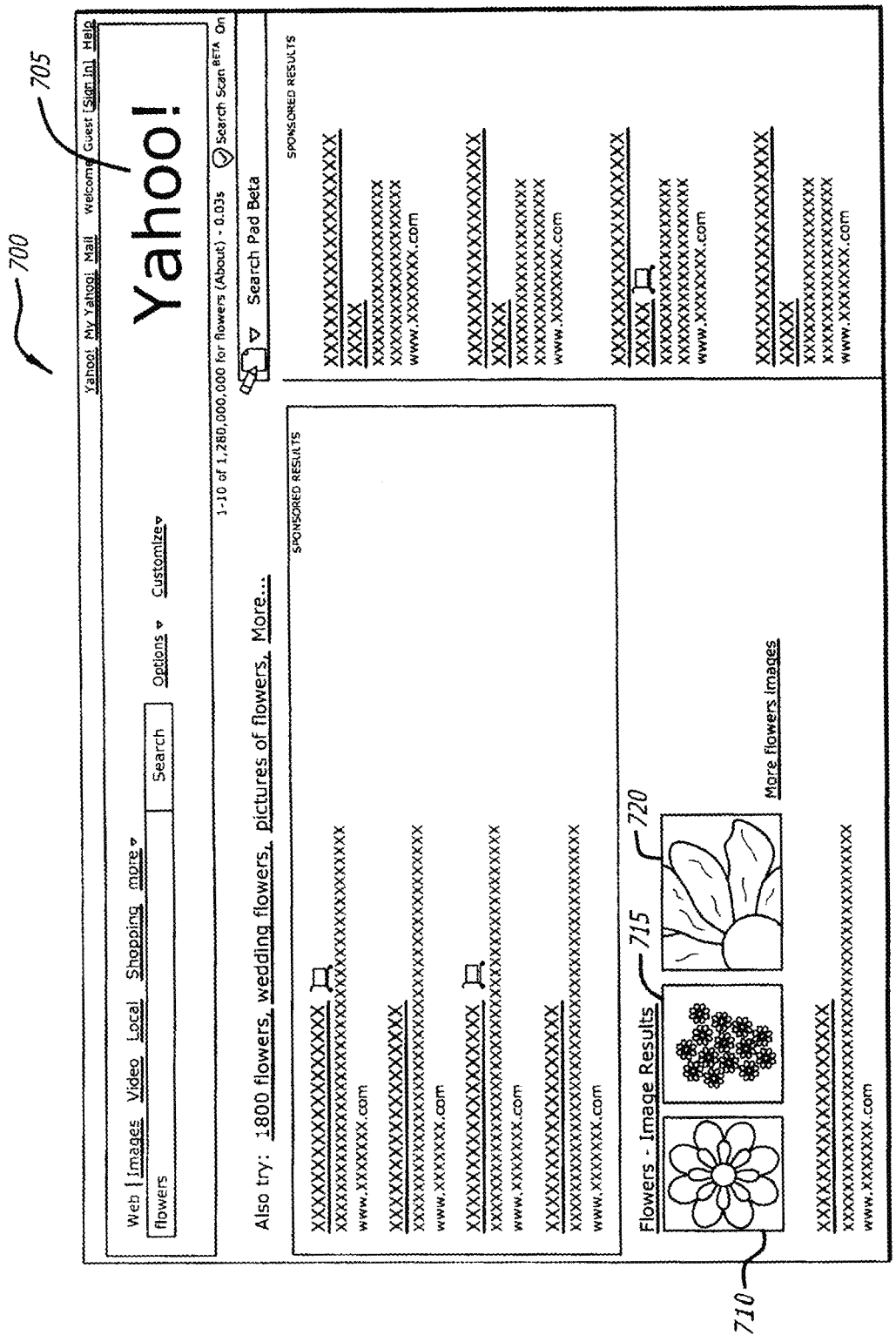
FIG. 7 shows an example of a search results web page in accordance with an embodiment of the present disclosure.

FIG. 7 shows an example of a search results web page 700. Examples of images that the browser 118 may have been instructed to prefetch and store in its memory 140 include the Yahoo! logo 705 and/or any one or more of the flower images 710, 715, 720.

As described above, in one embodiment the computing device 105 transmits multiple requests for search suggestions, one request for each search query input into the search term entry area (e.g., a first request for "exa", a second request for "examp", and a third request for "example", as the user is typing "example" into the search term entry area). In one embodiment, the web server 110 transmits browser instructions 130 to the web browser 118 only one time (or a set number of times) as the user is typing "example" into the search term entry area so that a web page component 150 for a search results web page corresponding to the search query "example" is prefetched and stored by the browser 118 one time. To have the browser 118 only store the web component 150 one time (or a set number of times) as the user is typing a word into the search term entry area, in one embodiment the web server 110 sets a software cookie.

Figure 8:
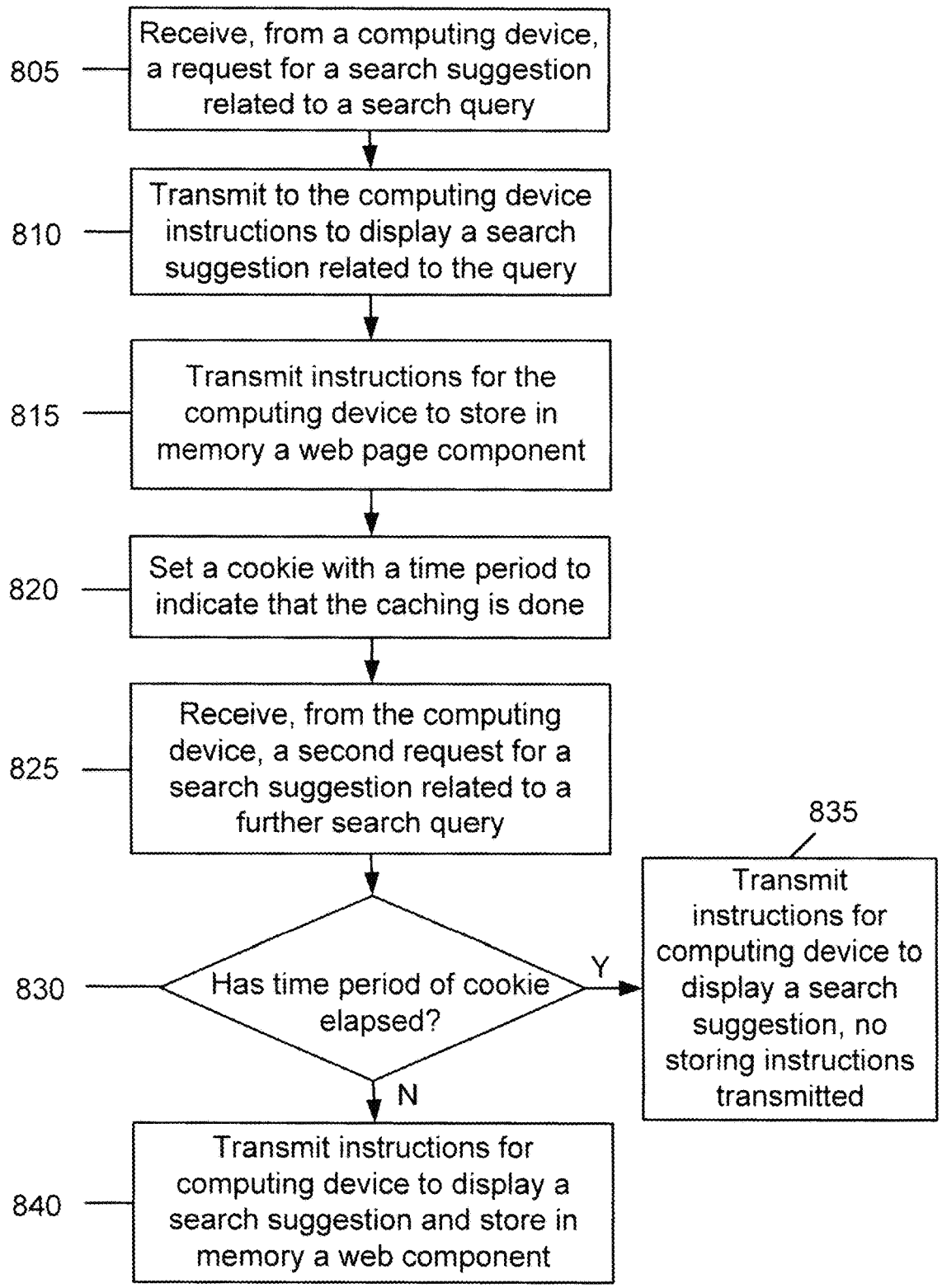
FIG. 8 is a flowchart illustrating the steps performed by the web server of FIG. 1 to cause the computing device to store a web page component associated with a search results web page in accordance with another embodiment of the present disclosure.

FIG. 8 is a flowchart illustrating an embodiment of the steps performed by the web server 110 to cause the computing device 105 to store the web page component 150. Steps 805-815 are steps that were described above (with respect to FIG. 2). In step 820, the web server 110 sets a cookie with a time period to indicate that the caching of the web page component 150 has been completed. In one embodiment, steps 810, 815, and 820 occur at the same time (or at approximately the same time). In another embodiment, these steps occur sequentially. The web server 110 then receives, from the computing device 105 (web browser 118), a second request for a search suggestion related to a further search query (e.g., "examp" after already receiving a request for a search suggestion related to a search query of "exa") (step 825). The web server 110 then determines whether the time period of the cookie has elapsed (step 830).

If the time period has not elapsed, the web server 110 transmits instructions for the computing device 105 to display a search suggestion and store in memory 140 a web page component 150 (step 840). In one embodiment, the browser 118 downloads the web page component 150 after verifying that the web page component 150 is not already stored in the memory 140. If the time period has elapsed, the web server 110 transmits instructions for the computing device 105 to display a search suggestion but does not include instructions to download a web page component (because, since the time period associated with the cookie has elapsed, it is highly likely that the web page component has already been downloaded and stored in memory 140). In one embodiment, the time period associated with the cookie is 10-15 seconds after the initial setting of the cookie.

In one embodiment, the computing device 105 preloads and stores (e.g., caches) Domain Name System (DNS) lookups. When a person types a URL into the address bar of the web browser 118, the web browser 118 has to resolve this textual web address into a physical IP address of the correct web server hosting the web page associated with the URL. This is referred to as a DNS lookup. DNS lookups are needed to find domains. For example, in the web address: http://www.example.org/image.png, the domain is www.example.org. Thus, if the web browser 118 needs to load several images: 1) http://www.example.org/image1.png; 2) http://www.example.org/image2.png; and 3) http://www.example.org/image3.png, the web browser 118 needs to make one DNS lookup to match www.example.org to an IP address.

Figure 9:
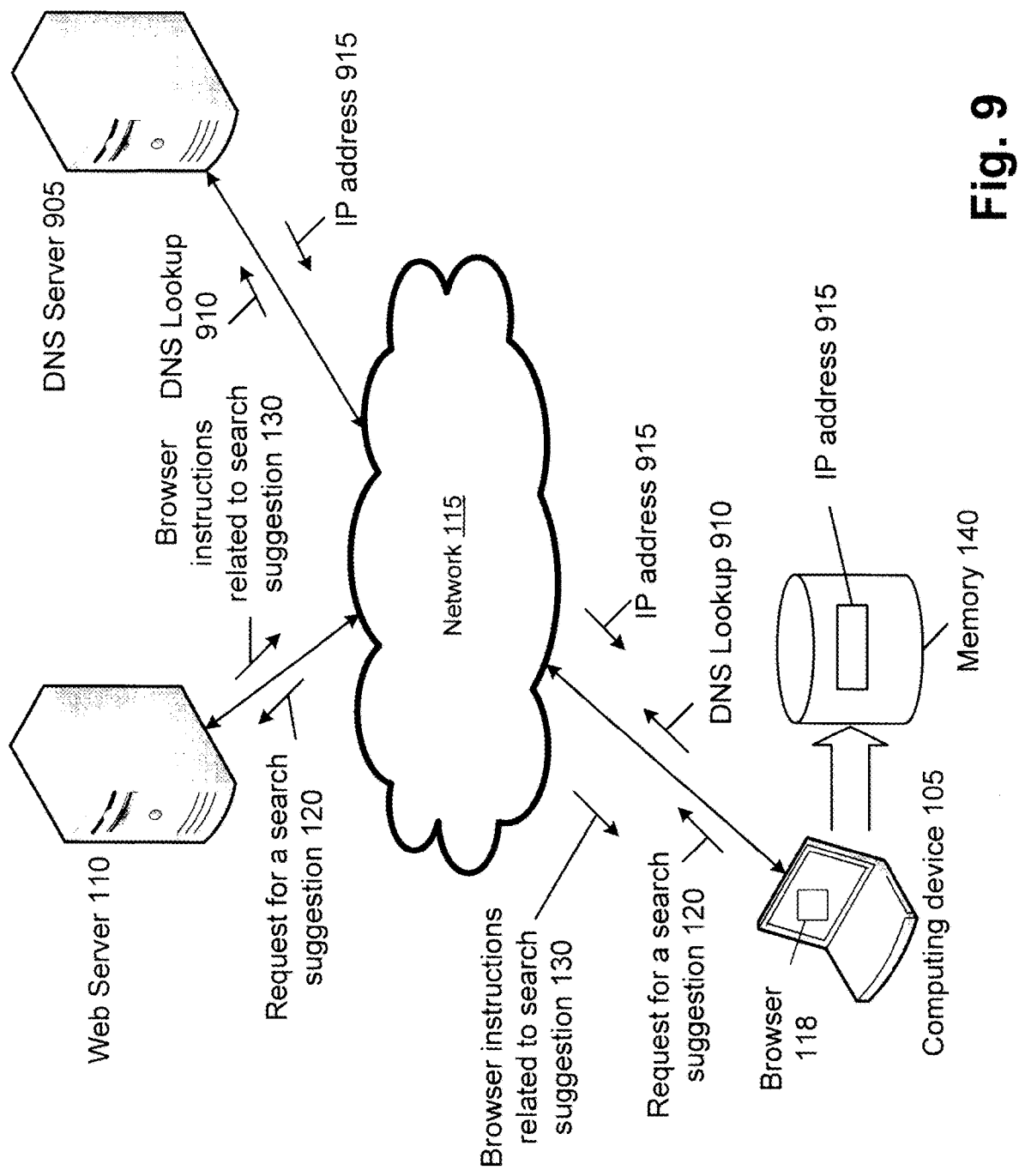
FIG. 9 is a block diagram of a computing device communicating with a web server and a DNS server over a network in accordance with an embodiment of the present disclosure.
Figure 10:
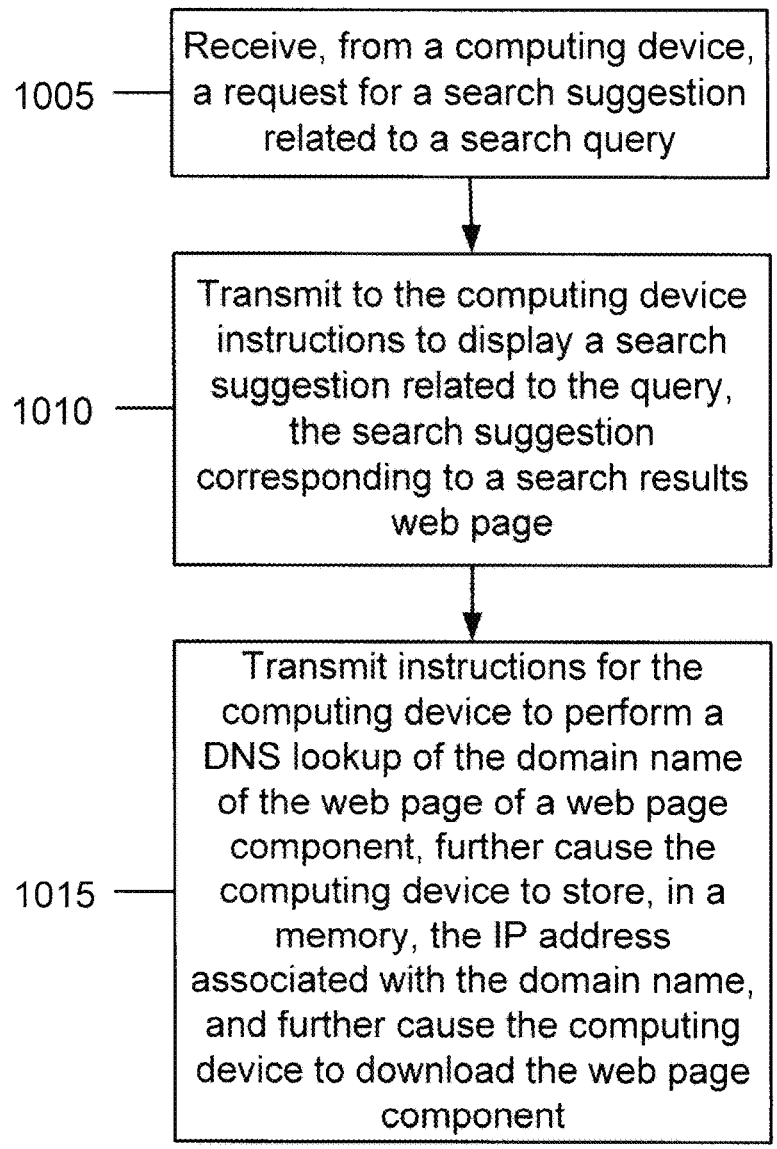
FIG. 10 is a flowchart illustrating the steps performed by the web server of FIG. 9 to cause the computing device to store the IP address associated with a domain name in accordance with an embodiment of the present disclosure.

In one embodiment, the web browser 118 can preload DNS lookups so that the process does not slow down the user when the user requests to navigate to the actual web page. FIG. 9 shows a block diagram of an embodiment of the computing device 105 communicating with the web server 110 and a DNS server 905 over network 115. FIG. 10 is a flowchart illustrating the steps performed by the web server 110 of FIG. 9 to cause the computing device 105 to store an IP address associated with a domain name before the IP address is needed by the browser 118.

In one embodiment, the web server 110 hosts a web page component (e.g., an image associated with a particular web page) on a web page having a domain name. As described above, the web browser 118 transmits and the web server 110 receives a request 120 for a search suggestion related to a search query (step 1005). The web server 110 transmits browser instructions 130 related to a search suggestion to the web browser 118. As described above, the browser instructions 130 include instructions for the web browser 118 to display a search suggestion related to the query, where the search suggestion corresponds to a search results web page (step 1010). In one embodiment, the browser instructions 130 further cause the computing device 105 to perform a DNS lookup 910 of the domain name of the web page, store in memory 140 the IP address 915 associated with the domain name, and download (and store), but not visibly display during the display of the search suggestion, the web page component (step 1015).

As an example, suppose a company's web pages are hosted on www.example.org and the images associated with these web pages are hosted on images.example.org. Search suggestions are provided from http://www.example.org/suggest.php?search=SEARCHTERM. Further suppose that the company wants to cache the DNS lookups to images.example.org in order to speed up the loading of the web pages hosted on www.example.org. It should be noted that www.example.org and images.example.org are considered two different domains that each needs a DNS lookup.

In one embodiment, the company can host a small (0×0 pixels or 1×1 pixels) image (dot.png) at http://images.example.org/dot.png. If a user types "test" in the search term entry area, the web browser 118 transmits a request 120 for a search suggestion to http://www.example.org/suggest.php?search=test. The web server 110 responds with the following browser instructions 130 (e.g., in an XML document):

```
<?xml version="1.0"?>
<SearchSuggestion version="2.0" xmlns="http://opensearch.org/searchsuggest2">
  <Query>test</Query>
  <Section title="Search Suggestions">
    <Item>
```

-continued

```
      <Text>test search</Text>
      <Image source="http://images.example.org/dot.png" width="0"
      height="0"/>
    </Item>
    <Item>
      <Text>IQ test</Text>
    </Item>
    ...
    <Item><Text>my test</Text></Item>
  </Section>
</SearchSuggestion>
```

In one embodiment, the web browser 118 then downloads the 0×0 image (dot.png) from http://images.example.org/dot.png. In order to do so, the web browser 118 needs to do a DNS lookup and store (e.g., cache) the associated IP address. The web browser 118 doesn't display the dot.png image because it has a height and width of 0×0 pixels in the browser instructions 130. The web browser 118 displays the www.example.org page and the DNS lookup is already cached, which saves time and improves the user experience.

Figure 11:
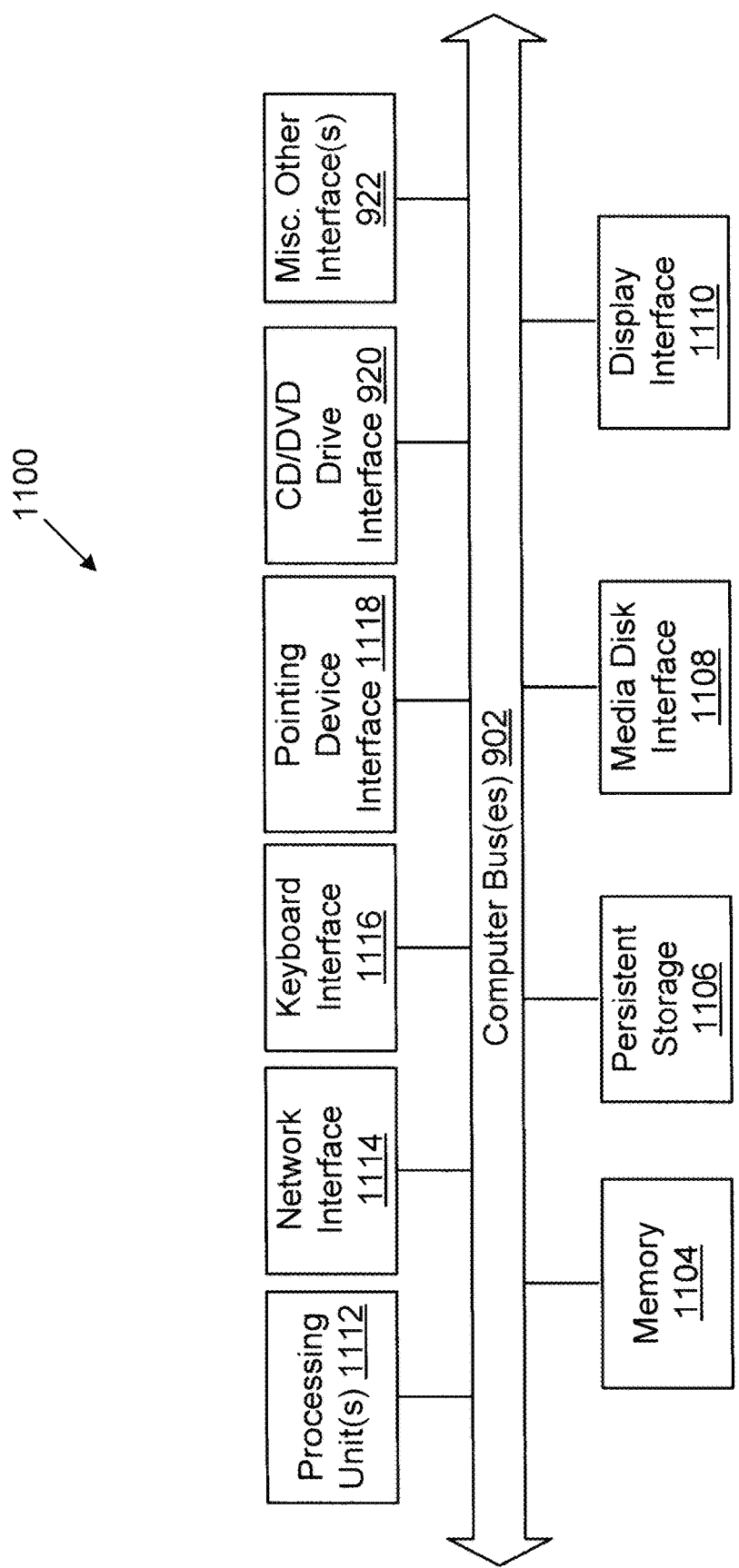
FIG. 11 is a block diagram illustrating an internal architecture of a computing device in accordance with an embodiment of the present disclosure.

FIG. 11 is a block diagram illustrating an internal architecture of a computing device, such as web server 110 and/or computing device 105, in accordance with one or more embodiments of the present disclosure. As shown in FIG. 11, internal architecture 1100 includes one or more processing units (also referred to herein as CPUs) 1112, which interface with at least one computer bus 1102. Also interfacing with computer bus 1102 are fixed disk 1106, network interface 1114, memory 1104, e.g., random access memory (RAM), run-time transient memory, read only memory (ROM), etc., media disk drive interface 1108 as an interface for a drive that can read and/or write to media including removable media such as floppy, CD-ROM, DVD, etc. media, display interface 1110 as interface for a monitor or other display device, keyboard interface 1116 as interface for a keyboard, pointing device interface 1118 as an interface for a mouse or other pointing device, and miscellaneous other interfaces not shown individually, such as parallel and serial port interfaces, a universal serial bus (USB) interface, and the like.

Memory 1104 interfaces with computer bus 1102 so as to provide information stored in memory 1104 to CPU 1112 during execution of software programs such as an operating system, application programs, device drivers, and software modules that comprise program code, and/or computer-executable process steps, incorporating functionality described herein, e.g., one or more of process flows described herein. CPU 1112 first loads computer-executable process steps from storage, e.g., memory 1104, storage 1106, removable media drive, and/or other storage device. CPU 1112 can then execute the stored process steps in order to execute the loaded computer-executable process steps. Stored data, e.g., data stored by a storage device, can be accessed by CPU 1112 during the execution of computer-executable process steps.

Persistent storage 1106 is a computer readable storage medium that can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure.

For the purposes of this disclosure a computer readable storage medium stores computer data, which data can include computer program code executable by a computer, in machine readable form. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
   receiving, by a server computing device, a first request for a first search suggestion related to a first search query that has been input into a search term entry field provided by a user computing device;
   instructing, by the server computing device, the user computing device to display the first search suggestion related to the first search query;
   setting, by the server computing device, a cookie comprising information indicating a retrieval time period corresponding to the user computing device and a web component;
   using, by the server computing device, the cookie's information indicating the retrieval time period to determine whether the user computing device has the web component; and
   transmitting, by the server computing device, an instruction to the user computing device instructing the user computing device to retrieve and store the web component when it is determined that the retrieval time period indicated by the cookie's information has not elapsed indicating that the user computing device does not have the web component.

2. The method of claim 1, wherein the search term entry field is in an area displayed by a web browser executing on the user computing device.

3. The method of claim 1, wherein the first search suggestion represents content from first search results.

4. The method of claim 1, further comprising:
receiving, by the server computing device, a second request for a second search suggestion related to a second search query that has been input into the search term entry field; and
instructing, by the server computing device, the user computing device to display the second search suggestion related to the second search query prior to displaying second search results corresponding to the second search suggestion.

5. The method of claim 4, wherein the second search suggestion represents content from the second search results.

6. The method of claim 4, further comprising:
making, by the server computing device, a determination that the retrieval time period has not elapsed indicating that the user computing device does not have the web component; and
responsive to the determination indicating that the retrieval time period has not elapsed, the server computing device instructing the user computing device to display the second search suggestion and further instructing the user computing device to retrieve and store the web component.

7. The method of claim 4, further comprising:
making, by the server computing device, a determination that the retrieval time period has elapsed indicating that the user computing device has the web component; and
responsive to the determination indicating that the retrieval time period has elapsed and the user computing device has the web component, the server computing device instructing the user computing device to display the second search suggestion without further instructing the user computing device to retrieve and store the web component.

8. The method of claim 1, further comprising:
instructing, by the server computing device, the user computing device to retrieve and store a web component associated with first search results prior to providing the first search results.

9. The method of claim 8, further comprising:
setting an expire time for the web component associated with the first search results.

10. The method of claim 9, wherein the expire time corresponds to a date and time upon which the web component will no longer be stored by the user computing device.

11. A non-transitory computer readable storage medium storing computer program instructions configured to be executed by a computer processor to cause a computer to:
receive, from a user computing device, a first request for a first search suggestion related to a first search query that has been input into a search term entry field provided by the user computing device;
instruct the user computing device to display the first search suggestion related to the first search query;
set a cookie comprising information indicating a retrieval time period corresponding to the user computing device and a web component;
use the cookie's information indicating the retrieval time period to determine whether the user computing device has the web component; and
transmit an instruction to the user computing device instructing the user computing device to retrieve and store the web component when it is determined that the retrieval time period indicated by the cookie's information has not elapsed indicating that the user computing device does not have the web component.

12. The medium of claim 11, wherein the search term entry field is in an area displayed by a web browser executing on the user computing device.

13. The medium of claim 11, wherein the first search suggestion represents content from first search results.

14. The medium of claim 11, wherein the instructions are further configured to be executed by the computer processor to cause the computer to:
receive a second request for a second search suggestion related to a second search query that has been input into the search term entry field; and
instruct the user computing device to display the second search suggestion related to the second search query.

15. The medium of claim 14, wherein the second search suggestion represents content from second search results.

16. The medium of claim 14, wherein the instructions are further configured to be executed by the computer processor to cause the computer to:
responsive to a determination indicating that the retrieval time period has not elapsed signifying that the user computing device does not have the web component, instruct the user computing device to display the second search suggestion and further instruct the user computing device to retrieve and store the web component; and
responsive to a determination indicating that the retrieval time period has elapsed signifying that the user computing device has the web component, instruct the user computing device to display the second search suggestion without instructing the user computing device to retrieve and store the web component.

17. The medium of claim 11, wherein the instructions are further configured to be executed by the computer processor to cause the computer to:
instruct the user computing device to retrieve and store a web component associated with first search results prior to providing the first search results.

18. The medium of claim 17, wherein the instructions are further configured to be executed by the computer processor to cause the computer to set an expire time for the web component associated with the first search results, and wherein the expire time corresponds to a date and time upon which the web component will no longer be stored by the user computing device.

19. A computing device:
a processor; and
a non-transitory storage medium for tangibly storing thereon program logic for execution by the processor, the program logic comprising:
receiving logic executed by the processor for receiving a first request for a first search suggestion related to a first search query that has been input into a search term entry field provided by a user computing device;
instructing logic executed by the processor for instructing the user computing device to display the first search suggestion related to the first search query;

setting logic executed by the processor for setting a cookie comprising information indicating a retrieval time period corresponding to the user computing device and a web component;

using logic executed by the processor for using the cookie's information indicating the retrieval time period to determine whether the user computing device has the web component; and transmitting logic executed by the processor for transmitting an instruction to the user computing device instructing the user computing device to retrieve and store the web component when it is determined that the retrieval time period indicated by the cookie's information has not elapsed indicating that the user computing device does not have the web component.

* * * * *